United States Patent [19]
Akeno et al.

[11] Patent Number: 6,060,146
[45] Date of Patent: *May 9, 2000

[54] MOLDED SURFACE FASTENER MEMBER AND METHOD OF MANUFACTURING THE MEMBER

[75] Inventors: Mitsuru Akeno; Ryuichi Murasaki, both of Toyama, Japan

[73] Assignee: YKK Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/931,750

[22] Filed: Sep. 16, 1997

[30] Foreign Application Priority Data

Sep. 19, 1996 [JP] Japan ..................................... 8-247700
Jul. 15, 1997 [JP] Japan ..................................... 9-189401

[51] Int. Cl.$^7$ ................................. B32B 3/06; D01F 1/08
[52] U.S. Cl. ........................... 428/100; 428/138; 24/442; 264/173.1; 264/257; 264/260; 264/271.1; 264/273; 264/274; 264/275
[58] Field of Search ..................................... 428/100, 138, 428/195, 196; 24/442; 264/173.1, 257, 260, 271.1, 273, 274, 275

[56] References Cited

U.S. PATENT DOCUMENTS 5,643,651  7/1997  Murasaki ................. 428/100

FOREIGN PATENT DOCUMENTS

| 381 087A | 8/1990 | European Pat. Off. . |
| 580 072A | 1/1994 | European Pat. Off. . |
| 661 008A | 7/1995 | European Pat. Off. . |
| 749 707A | 12/1996 | European Pat. Off. . |

Primary Examiner—Christopher Raimund
Attorney, Agent, or Firm—Hill & Simpson

[57] ABSTRACT

First and second molten resins are continuously injected toward the respective circumferential surfaces of a die wheel and an associated roller in rotation in opposite directions. The die wheel has in its circumferential surface a multiplicity of engaging-element-forming cavities, and the associated roller is disposed in parallel confronting relationship with the die wheel with a gap equal to the thickness of a substrate sheet of a molded surface fastener member. During that time, a porous core sheet is introduced toward a meeting point of the first and second molten resins and is sandwiched between a first substrate sheet part, which is molded on the circumferential surface of the die wheel, and a second substrate sheet part, which is molded on the circumferential surface of the associated roller, to form a unitary laminate substrate sheet. The resulting molded surface fastener member is free from expansion and local thin portions in either substrate sheet part and is therefore prevented from being torn.

28 Claims, 9 Drawing Sheets

MOLDED SURFACE FASTENER MEMBER AND METHOD OF MANUFACTURING THE MEMBER

BACKGROUND OF THE INVENTION

1. Field of the Invention

This invention relates to a method of continuously manufacturing a molded surface fastener member and the molded surface fastener member manufactured by the method, which has a multiplicity of engaging elements standing on a front surface of a substrate sheet, by continuous injection molding using thermoplastic resin, and more particularly to a molded surface fastener member manufacturing method and the molded surface fastener member manufactured by the method, which is hard either to tear or to expand or which is expected to shield an electromagnetic wave.

2. Description of the Related Art

Generally, in this type molded surface fastener member in which a substrate sheet and a multiplicity of engaging elements are integrally and continuously molded from thermoplastic synthetic resin, orientation of molecules tends to occur in the longitudinal direction so that the surface fastener member tends to be torn in the longitudinal direction. Particularly in the case of soft synthetic resin, the material tends to excessively expand during molding so that the resulting substrate sheet tends to become wavy or puckered and hence would not be stable in shape, thus deteriorating the quality of products and causing a large difference in strength between the longitudinal direction and the transverse direction.

Since the conventional molded surface fastener member is merely continuously molded from thermoplastic resin, it tends to expand when it is pulled while being cut into pieces of the final product length, causing errors in size of the final products. Further, when the thus manufactured surface fastener member is attached to a garment by sewing, the substrate sheet tends to be torn due to the sewing needle so that occasionally an appropriate sewing operation cannot be achieved.

In view of the foregoing problems, Japanese Patent Laid-Open Publication No. 7-184707 discloses a method in which a molten resin is continuously injected directly from an injection nozzle to a circumferential surface of a die wheel having a multiplicity of engaging-element forming cavities and being driven to rotate, and simultaneously at least a fiber thread is introduced into a gap between the die wheel and the injection nozzle linearly or in a zigzag pattern, so as to embed the fiber thread integrally in the substrate sheet at the time of molding the substrate sheet and engaging elements.

However, in the molded surface fastener member which is manufactured by the method disclosed in the foregoing publication, the position of the thread embedded in the substrate sheet is inevitably off to the side having the engaging elements. Therefore, though the substrate sheet can be prevented from being expanded excessively, a resin material composing the substrate sheet where the fiber thread is embedded becomes extremely thin so that the substrate sheet tends to be torn along the fiber thread, thus the expected results cannot be achieved.

Further, since the fiber thread is made of a resin material, the resulted molded surface fastener member tends to be influenced by an electromagnetic wave, thus such surface fastener member is not suitable for a member to join parts which should not be influenced.

SUMMARY OF THE INVENTION

It is therefore an object of this invention to provide a molded surface fastener member which is prevented from unnecessary expansion and is kept in stable shape hard to tear and which is expected to shield an electromagnetic wave.

According to a first aspect of the invention, the above object is accomplished by a method of continuously manufacturing a molded surface fastener member having a substrate sheet and a multiplicity of engaging elements. The method comprises the steps of: rotating a die wheel, which has in its circumferential surface a multiplicity of engaging-element-forming cavities, in one direction; rotating an associated roller, which is disposed in confronting relation to the die wheel with a predetermined gap, in a direction opposite to the one direction; continuously injecting first molten resin from a first injection nozzle to the circumferential surface of the die wheel in rotation to mold a first part of the substrate sheet and to fill the engaging-element-forming cavities with part of the first molten resin; continuously injecting second molten resin in a predetermined width from a second injection nozzle to a circumferential surface of the associated roller in rotation to mold a second part of the substrate sheet; continuously supplying a resin-receivable core sheet toward a meeting point of the first and second parts of the substrate sheet, which revolve as carried on the respective circumferential surfaces of the die wheel and said associated roller, to introduce the resin-receivable core sheet between the first and second substrate sheet parts; pressing the first and second substrate sheet parts, with the introduced resin-receivable core sheet being centrally disposed, from opposite sides by the die wheel and the associated roller to form a unitary laminate surface fastener member; cooling the laminate surface fastener member together with the engaging elements; and positively drawing the cooled surface fastener member together with the engaging elements from the circumferential surface of the die wheel.

The resin-receivable core sheet is a porous sheet made of fiber, synthetic resin or metal. Alternatively, the resin-receivable core sheet is a non-porous sheet having resin-receiving recesses on front and rear sides. And the resin-receiving recess has such a contour that an amount of received resin increases from an inlet toward a bottom. With this resin-receiving recesses, even if the core sheet is non-porous, a part of the molten resin fills into the resin-receiving recesses to be integral with its peripheral portions, and the resin is molded to have a shape of inside contour of the resin-receiving recesses after the substrate sheet is cooled, thus the substrate sheet becomes integral with the core sheet and does not peel off the core sheet. For the non-porous resin-receiving core sheet, a synthetic resin sheet or a metal thin film is preferably used. Parts of the substrate sheet disposed on front and rear sides of the porous core sheet may be made of different materials.

According to this invention, there is provided another method of continuously manufacturing a molded surface fastener member having a substrate sheet and a multiplicity of engaging elements. The method comprises the steps of: rotating a die wheel, which has in its circumferential surface a multiplicity of engaging-element-forming cavities, in one direction; rotating an associated roller, which is disposed in confronting relation to the die wheel with a predetermined gap, in a direction opposite to the one direction; continuously injecting molten resin from an injection nozzle to the circumferential surface of the die wheel in rotation to mold part of the substrate sheet and to fill the engagingelement-forming cavities with part of the molten resin; continuously introducing a resin sheet along the circumferential surface of the associated roller in rotation; supplying a porous core sheet toward a meeting point of the molten resin and the resin sheet, which revolve as carried on the respective circumferential surfaces of the die wheel and the associated roller, to introduce the porous core sheet between the molten resin and the resin sheet; pressing the part of the substrate sheet and the resin sheet consisting the other part of the substrate sheet with the introduced porous core sheet being centrally disposed, from opposite sides by the die wheel and the associated roller to form a unitary laminate surface fastener member; cooling the laminate surface fastener member together with the engaging elements; and positively drawing the cooled surface fastener member together with the engaging elements from the circumferential surface of the die wheel.

If the resin sheet is preheated before being introduced to the meeting point, an improved affinity with the molten resin can be achieved which enables reliable integrality. The porous core sheet may be composed of at least a multiplicity of fiber threads spaced transversely of the substrate sheet at predetermined distances, or of at least a multiplicity of fiber threads spaced longitudinally of the substrate sheet at predetermined distances, or of at least a fiber thread extending longitudinally of the substrate sheet in a meandering pattern at predetermined pitches, or is in the form of woven web, knit web, non-woven cloth, mesh or synthetic resin film, each of which is high in porosity.

Parts of the substrate sheet disposed on front and rear sides of the porous core sheet may be made of the same material or of different materials. But the same material is preferably used, and even if the different materials are used, they need to have affinity with each other.

As a result, the molded surface fastener member of the invention manufactured by the foregoing method has such a construction that the core sheet is embedded substantially centrally in width direction of the substrate sheet, by introducing the core sheet between respective parts of synthetic resin substrate sheet, the parts being circumferentially moved on respective surfaces of the die wheel having a multiplicity of engaging-element forming cavities in its circumferential surface and rotating in one direction and of the associated roller disposed in confronting relation to the die wheel and rotating in a direction opposite to said one direction, and by pressing the parts of the synthetic resin substrate sheet by the die wheel and the associated roller so as to press the core sheet.

DETAILED DESCRIPTION OF THE PREFERRED EMBODIMENTS

Preferred embodiments of this invention will now be described in detail with reference to the accompanying drawings.

Figure 1:
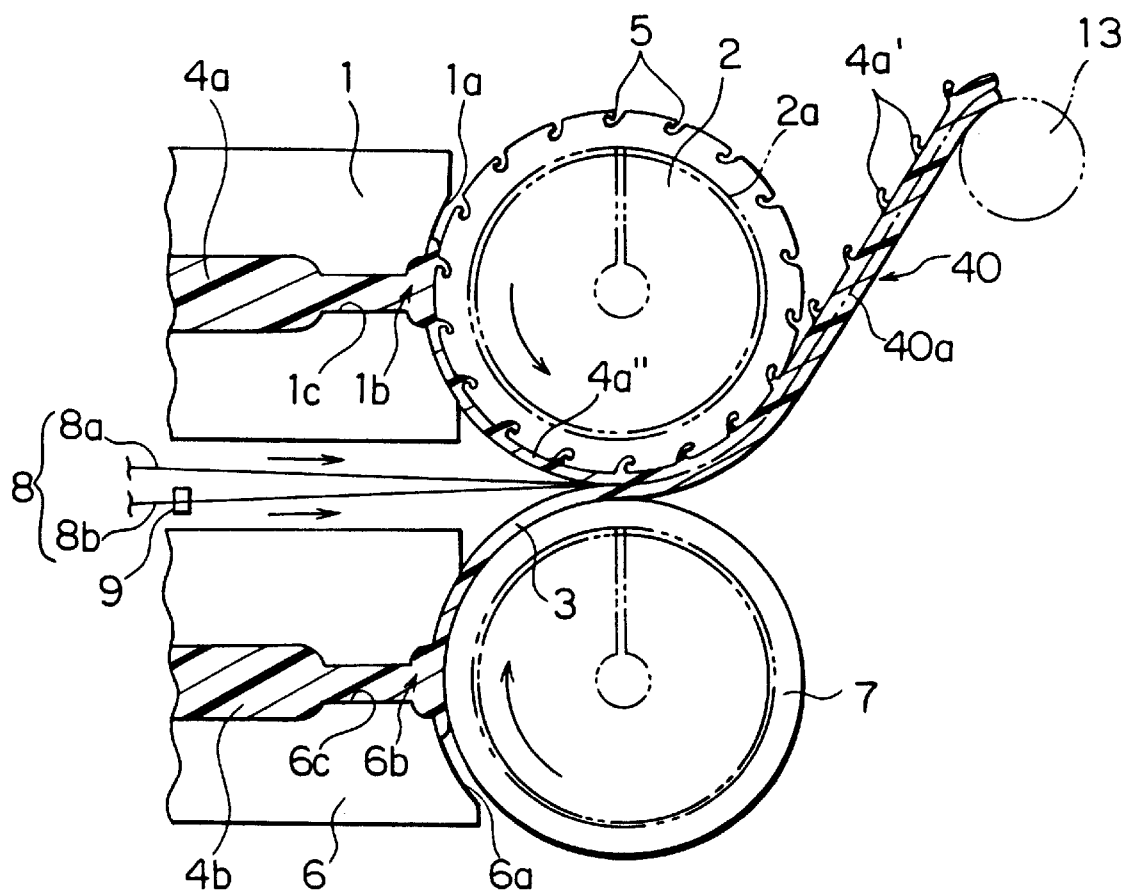
FIG. 1 is a fragmentary longitudinal cross-sectional view of an apparatus for carrying out a molded surface fastener member manufacturing method according to a first embodiment of method of this invention.

FIG. 1 is a fragmentary longitudinal cross-sectional view of an apparatus for carrying out a molded surface fastener member manufacturing method according to a first embodiment of method of this invention, showing the manner in which fiber threads are embedded longitudinally and transversely in a substrate sheet so as to cross one another.

In FIG. 1, reference number 1 designates a first injection nozzle, whose tip surface is an arcuate surface 1a disposed in confronting relationship with a circumferential surface of a die wheel (described below) 2 and spaced from the circumferential surface by a gap corresponding to substantially a half of the thickness of a substrate sheet 40a of a molded surface fastener member 40 to be manufactured. The injection nozzle 1 is in the form of a T-type die having in the center of the arcuate surface 1a a resin orifice 1b from which molten resin 4a is to be continuously injected. In this embodiment, the first injection nozzle 1 has a single sprue 1c.

The die wheel 2 is disposed with its axis being parallel to the resin orifice 1b, having a circumferential surface confronting the arcuate surface 1a of the first injection nozzle 1 with the above-mentioned gap. The die wheel 2 has a multiplicity of engaging-element-forming cavities 5 in its circumferential surface. The structure of the die wheel 2 is substantially similar to that disclosed in Japanese Laid-Open Publication No. Hei 7-184707. Namely, a central portion of the die wheel 2 is composed of a multiplicity of annular plates in laminate one on another along the axis so as to form a hollow cylindrical tube in which a cooling water jacket 2a is disposed. Each of every other annular plates has in each of opposite sides the multiplicity of engaging-elementforming cavities 5 opening to the circumferential surface, and each of the remaining annular plates is flat and smooth at opposite sides. Alternatively each remaining annular plate may has in each side a multiplicity of non-illustrated reinforcing-rib-forming cavities aligned with the respective engaging-element-forming cavities 5 of the corresponding adjacent annular plate. This die wheel 2 is driven by a non-illustrated conventional synchronous drive unit for rotation in the direction of an arrow.

Further, a second injection nozzle 6 is disposed below the first injection nozzle 1 and extends in parallel to it. In this embodiment, the second injection nozzle 6 is identical in structure with the first injection nozzle 1. An associated roller 7 is disposed in confronting relationship with an arcuate surface 6a of the second injection nozzle 6 and has a smooth circumferential surface spaced from the arcuate surface 6a of the second injection nozzle 6 with a gap substantially equal to a half of the thickness of the substrate sheet 40a. Reference numeral 6b is an orifice disposed centrally of the arcuate surface of the second injection nozzle 6. Further, the roller 7 is in parallel confronting relationship with the die wheel 2 with a gap substantially equal to the thickness of the substrate sheet 40a.

Upper and lower groups of fiber threads 8a, 8b are introduced toward the gap between the die wheel 2 and the associated roller 7 via the space between the first and second injection nozzle 1, 6. The fiber threads of the upper group 8a are horizontally arranged and are parallel spaced at predetermined distances from one another, and the lower group 8b is composed of one or more fiber threads horizontally arranged and parallel spaced at predetermined distances from one another. Each fiber thread of the lower group 8b is swung by a predetermined width horizontally parallel to the axes of the die wheel 2 and the associated roller 7 by a traversing means 9.

The traversing means 9 may be conventional means popular in the field of textile machines and it may be a conventional weft yarn filling device (weft yarn carrier) to be used in a narrow-width weaving machine disclosed in, for example, U.S. Pat. No. 4,682,635.

In the illustrated example, the individual fiber threads of the upper group 8a are paid out linearly in the direction of rotation of the die wheel 2 via a number of thread guides fixed to a non-illustrated frame or the like, while each fiber thread of the lower group 8b is swung by a predetermined width in parallel to the axis of the die wheel 2 by the traversing means 9. Accordingly each fiber yarn of the lower group 8b is supplied to a meeting point of first and second molten resins which are carried by the respective circumferential surfaces of the die wheel 2 and the associated roller 7, in a meandering pattern crossing the individual fiber threads of the upper group 8a being paid out linearly in the direction of rotation of the die wheel 2. By changing the traversing speed, it is possible to vary the inter-thread pitch in the direction of rotation of the die wheel 2 as desired. As they are continuously supplied crossing one another, the individual fiber threads of the upper group 8a and each fiber thread of the lower group 8b are sandwiched between the first and second molten resins revolving as carried by the die wheel 2 and the associated roller 7, respectively. As a result, a porous core sheet 8 is formed of the fiber threads of the upper and lower groups 8a, 8b.

The resin material and the fiber thread material are exemplified by thermoplastic resins, such as nylon, polyester, polypropylene and vinyl chloride. For the resin material and the thread material, the same kind or different kinds of resin and/or threads of animal, botanical or inorganic fibers may be used. In molding operation, temperature of each molten resin, injecting pressure, temperature of the die wheel, rotating speed of the die wheel, etc. are adjusted in accordance with the material used.

According to the apparatus for the method of this embodiment, the first and second molten resins 4a, 4b continuously injected from the first and second injection nozzles 1, 6 are expanded in the respective gaps defined with the confronting circumferential surfaces of the die wheel 2 and the associated roller 7 in rotation in opposite directions, revolve around the die wheel 2 and the associated roller 7 in response to their respective rotations and meet together between the die wheel 2 and the associated roller 7. During that time, part of the first molten resin 4a injected from the first injection nozzle 1 is filled in the engaging-element-forming cavities 5 successively to form engaging elements 4a', and part of the first molten resin 4a is continuously shaped into a first substrate sheet part 4a" having a thickness substantially equal to a half of the thickness of the substrate sheet 40a of a molded surface fastener as a final product and a predetermined width. And the second molten resin 4b continuously injected from the second injection nozzle 6 is continuously shaped into a resin sheet 3 on the smooth circumferential surface of the associated roller 7 in response to its rotation. The resin sheet 3 meets the first substrate sheet part 4a" as a second substrate sheet part at the meeting point between the die wheel 2 and the associated roller 7. The resin sheet 3 is substantially equal in thickness and width to the first substrate sheet part 4a".

While the first substrate sheet part 4a" and the resin sheet 3 thus meet, the individual fiber threads of the upper and lower groups 8a, 8b also merge at the meeting point crossing one another to form a porous core sheet 8 to be sandwiched between the first substrate sheet part 4a" and the resin sheet 3. In this embodiment, the porous core sheet 8 is composed of the upper and lower fiber thread groups 8a, 8b. Alternatively the porous core sheet 8 may be composed of a number of straight parallel fiber threads of only the upper group 8a or the lower group 8b, or in the form of rough net, woven web or knit web 80, or non-woven cloth 80a or resin film 80b having a multiplicity of through-holes, as shown in FIGS. 4 through 7. Alternatively, fine metal wires can be used instead of fiber threads.

The first substrate sheet part 4a", the resin sheet 3 and the porous core sheet 8 are formed into a unitary laminate substrate sheet 40a of the molded surface fastener member 40 as the final product. In the unitary laminate substrate sheet 40a, the porous core sheet 8 is centrally embedded as the first substrate sheet part 4a" and the resin sheet 3 are pressed against the front and rear surfaces, respectively, of the porous core sheet 8 between the die wheel 2 and the associated roller 7. At that time excessive resin materials moves transversely outwardly toward opposite axial ends of the die wheel 2 and the associated roller 7 via the gap between them. The substrate sheet 40a, in which the porous core sheet 8 is embedded, revolves along substantially a quarter of the circumferential surface of the die wheel 2 as guided by a guide roller 13, during which the substrate sheet 40a together with the engaging elements 4a' are cooled from inside of the die wheel 2 and are hence solidified as the final product, namely, the molded surface fastener member 40. During this solidification, the substrate sheet 40a is drawn in the direction of injection under an appropriate pulling force, the individual engaging elements 4a' in the cavities 5 are smoothly removed off the cavities 5 resiliently deforming in straight posture, and immediately after that, they restore their original shape to become completely solidified.

Figure 3:
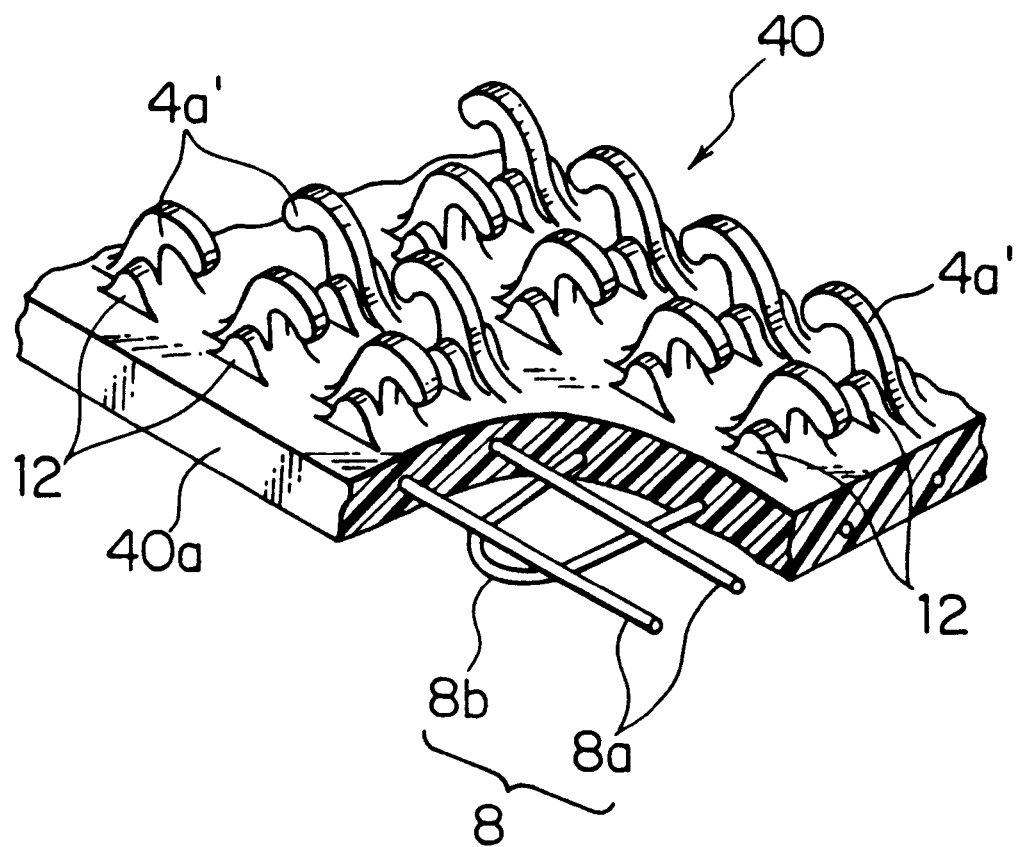
FIG. 3 is a fragmentary perspective view, with parts broken away, of a molded surface fastener member according to a first embodiment of a surface fastener member manufactured by the apparatus of FIG. 1.

In the thus manufactured surface fastener member 40, since a plurality of parallel straight threads extending longitudinally of the substrate sheet 40a and a single meandering thread repeatedly crossing the straight threads as traversed transversely of the substrate sheet 40a are embedded in the substrate sheet 40a centrally of its thickness as shown in FIG. 3, the surface fastener member 40 is stable in shape free from unnecessary expansion even when it is drawn from the die wheel 2 and is prevented from being torn or otherwise damaged due to the sewing needle during sewing.

FIG. 8 is a cross-sectional view of a molded surface fastener showing another embodiment of the invention manufactured by the apparatus of FIG. 1. As is understood from this drawing, a core sheet 800 in the illustrated example, to be integrally embedded in the surface fastener member 40 is non-porous. Therefore, if the core sheet 800 has a mere flat sheet structure, if the core sheet 800 has affinity with the substrate sheet 40a so as to have a strong adhesion, it would be hard to be removed off the substrate sheet 40a. However, they can be removed off each other more easily comparing with the embodiment in which the resin materials on the front and rear sides are welded integrally through through-holes in the core sheet 8, 80.

Figure 8A:
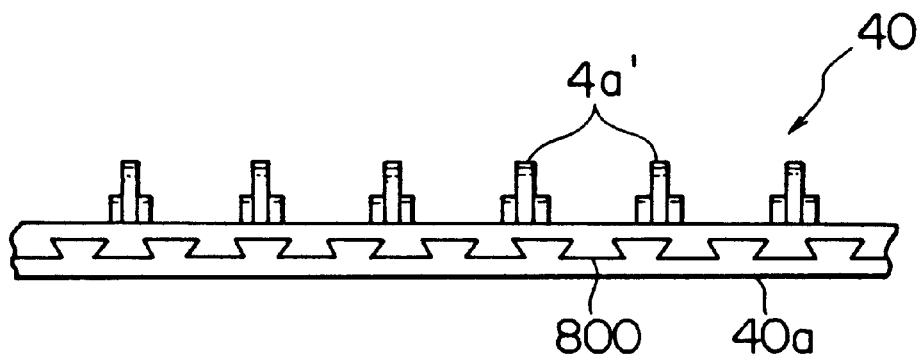
FIG. 8A is a fragmentary transverse-cross-sectional view of a molded surface fastener member according to a sixth embodiment of the surface fastener member using a non-porous sheet.
Figure 8B:
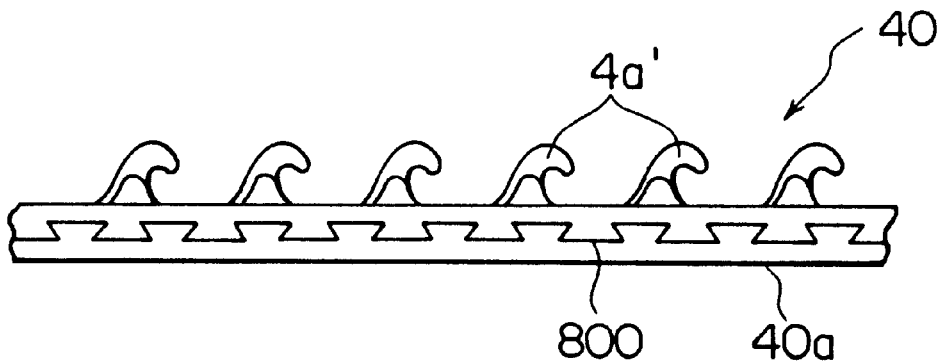
FIG. 8B is a fragmentary longitudinal-cross-sectional view of the molded surface fastener member of the sixth embodiment.
Figure 9:
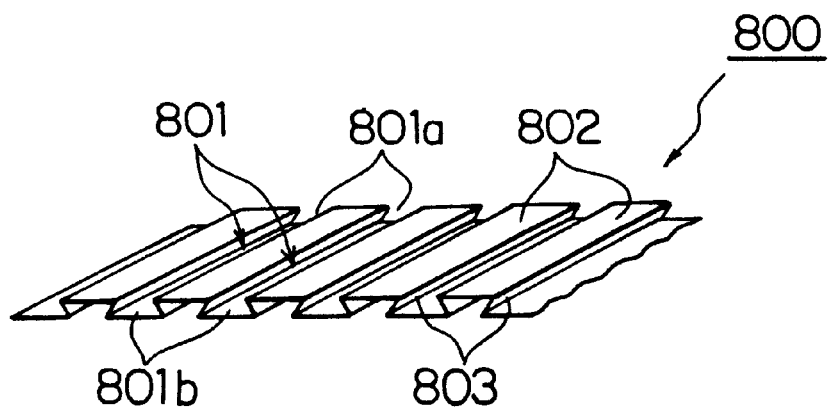
FIG. 9 is a fragmentary perspective view showing a first example of the non-porous sheet to be used in the molded surface fastener member.

In this embodiment, as shown in FIG. 9, the core sheet 800 has a zigzag shape in which side edges of each pair of adjacent horizontal surface portions 802 on the front and rear sides are connected via slanting portions 803. With this structure, the core sheet 800 has resin-receiving recesses 801 on both sides alternately, each of which has such a contour that an amount of received resin increases from an inlet 801a toward a bottom 801b thereof. The surface fastener member 40 as shown in FIGS. 8A and 8B is manufactured by introducing the core sheet 800 between parts 3, 4a" of the substrate sheet 40a instead of the multiplicity of fiber threads 8a, 8b of FIG. 1.

In the surface fastener member 40 shown in FIG. 8A, the core sheet 800 is introduced with its resin-receiving recesses 801 being parallel to a direction of molding the engaging elements 4a'. FIG. 8B shows the surface fastener member 40 in which the core sheet 800 is introduced with the resin-receiving recesses 801 being perpendicular to the direction of molding the engaging elements 4a'. At the time of introduction, the core sheet 800 is preferably introduced in the direction shown in FIG. 8B if the shape of the core sheet 800 is required to be stabilized.

Figure 10A:
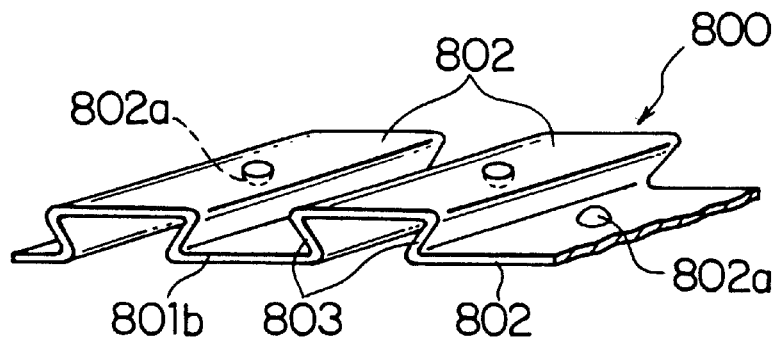
FIG. 10A is a fragmentary perspective view of a modification of the sheet of FIG. 9.
Figure 10B:
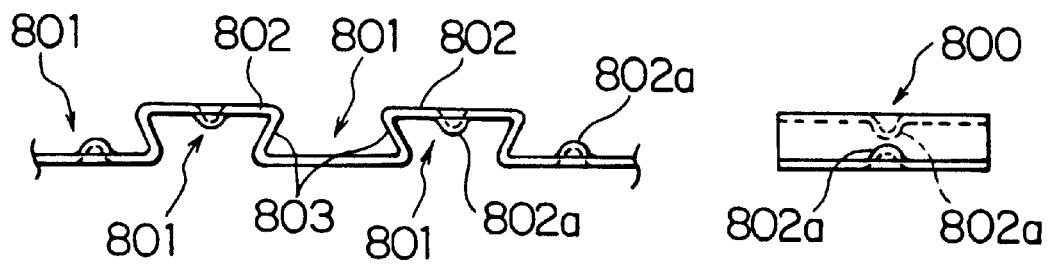
FIG. 10B is a fragmentary side view of the modification of the sheet of FIG. 9.
Figure 10C:
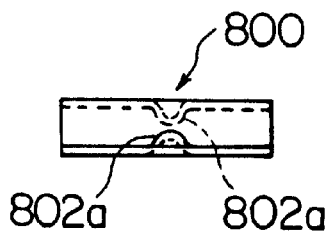
FIG. 10C is fragmentary front view of the modification of the sheet of FIG. 9.

FIG. 10 shows an modification of the core sheet 800 of FIG. 9. In this modification, a semi-spherical projection 802a is provided substantially centrally in width direction on the horizontal surface portion 802 of the core sheet 800. With the projection 802a, anchoring effect with the parts 4a", 3 on the front and rear sides of the core sheet 800 improves/For the foregoing core sheet 800, a metal thin film sheet is used. Use of the metal thin film core sheet 800 provides shielding effect against electromagnetic wave and enables adhesion to magnetic articles.

Figure 11:
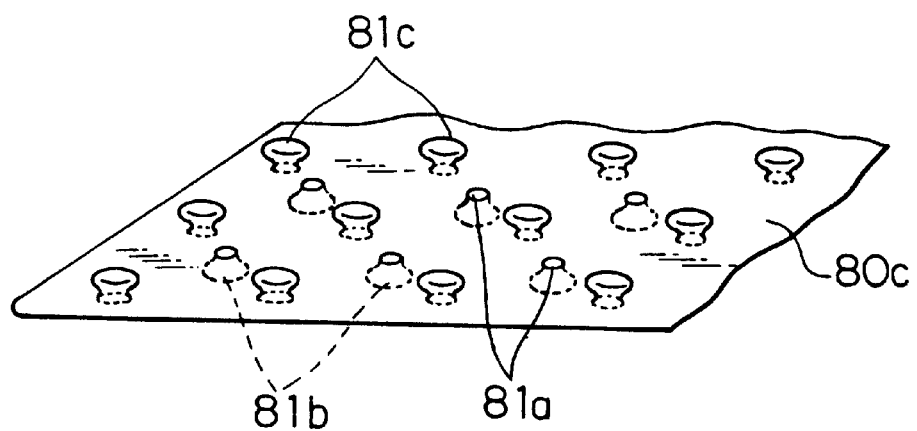
FIG. 11 is a fragmentary perspective view showing a second example of the non-porous sheet to be used in the molded surface fastener member.
Figure 12:
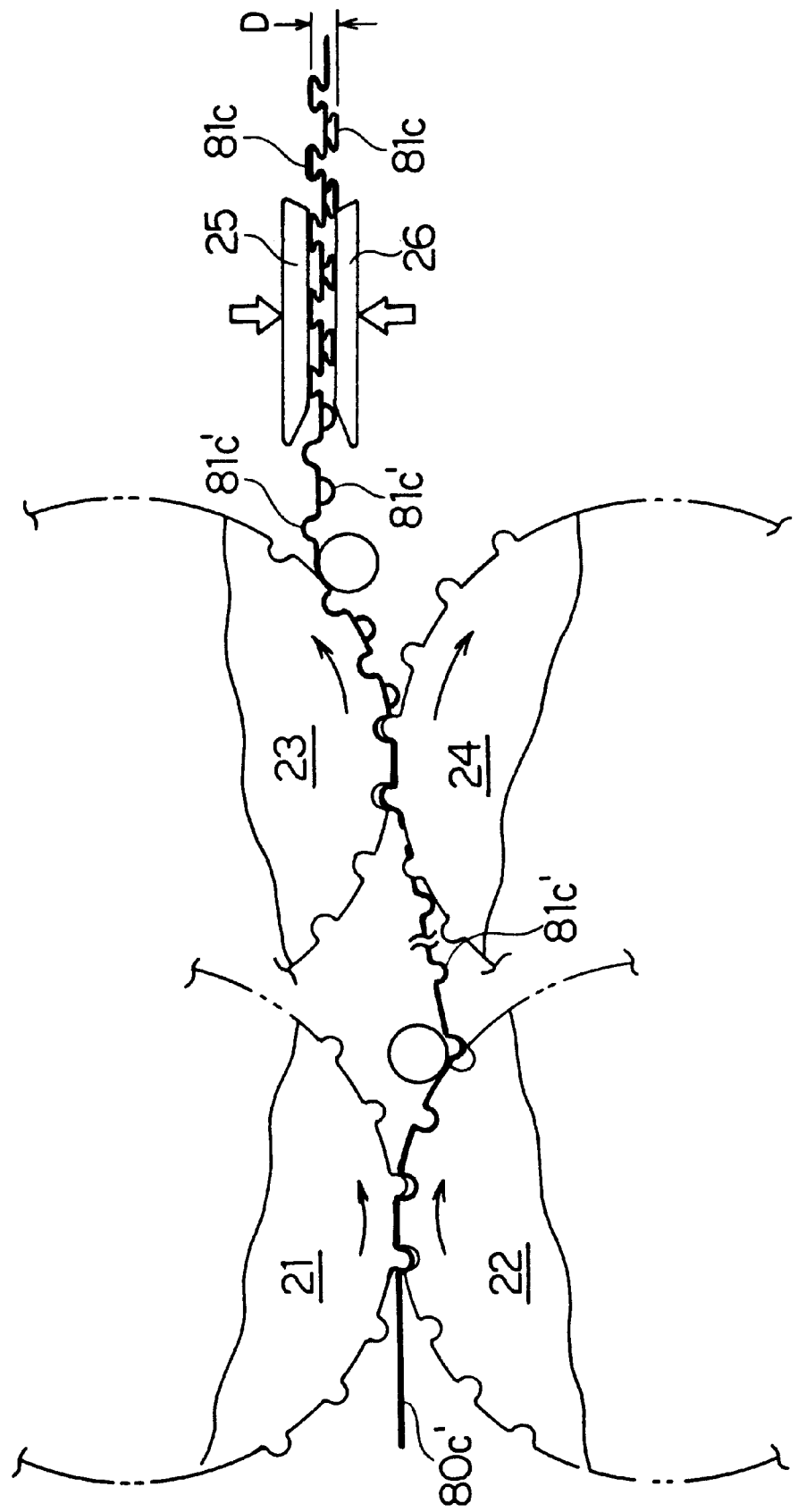
FIG. 12 is a view showing a manufacturing process of the second example of the sheet.

FIG. 11 is a modification of the core sheet in which a thermoplastic resin film 80c is used. A multiplicity of mushroom-shape recesses 81c having flat bottom portions are provided on front and rear sides of the core sheet 80c. Inside of the recess 81c serves as the resin-receiving recess of the invention. The core sheet 80c of such structure can be manufactured continuously by a series of processes shown in FIG. 12, for example. In FIG. 12, a synthetic resin film 80c' passes between two pairs of embossing rollers 21, 22; 23, 24 to form a multiplicity of recesses 81c' on its front and rear sides alternately. After passing through the second pair of emboss rollers 23, 24, the synthetic resin film 80c' is introduced between a vertical pair of pressing plates 25, 26 disposed with a predetermined gap D inbetween. The pressing plates 25, 26 are heated upto a melting point of the synthetic resin film 80c', and the gap D is set to be smaller than a distance between apexes of the recesses 81c' formed on the front and rear sides of the synthetic resin film 80c'. Thus bottom portions of the recesses 81c' on the front and rear sides are pressed vertically to be flat so as to form the recesses 80c when the synthetic resin film 81c' passes between the upper and lower pressing plates 25, 26. After that, the synthetic resin film 80c' is cooled to be finalized as the core sheet 80c having structure as shown in FIG. 10.

Figure 13:
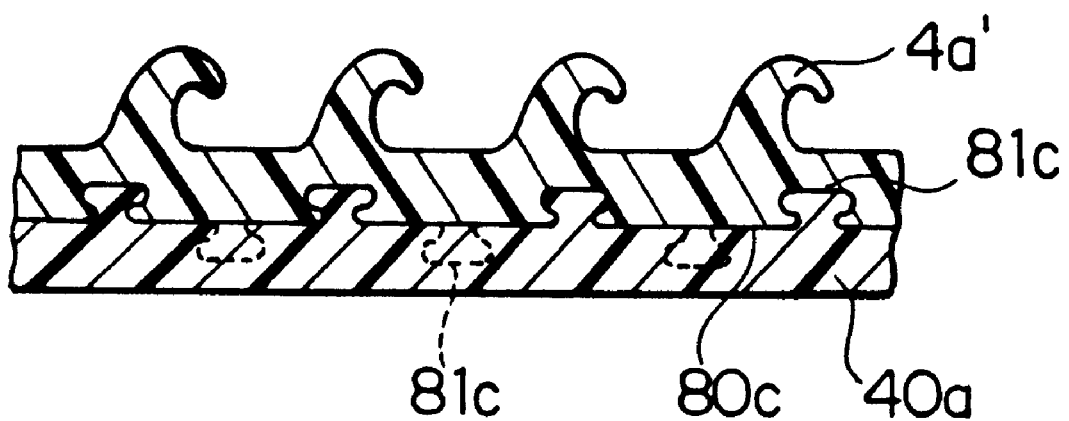
FIG. 13 is a fragmentary cross-sectional view of a molded surface fastener member according to a seventh embodiment of the surface fastener member, in which the sheet is integrally embedded.

By introducing thus manufactured core sheet 80c between the parts 4a", 3 of the substrate sheet instead of the fiber threads 8a, 8b of FIG. 1, the molded surface fastener member having a structure of FIG. 13 can be obtained. Due to the existence of the recesses 81c, a part of the parts 4a", 3 of the substrate sheet 40a made to be integral with the core sheet 80c enters in the recesses 81c so as to join with the core sheet 80c firmly.

In the foregoing modifications using the non-porous core sheet, one is made of metal and the other is made of synthetic resin. However, the materials are not limited to the ones as described in respective modifications, metal can be substituted by synthetic resin and vice versa.

Figure 2:
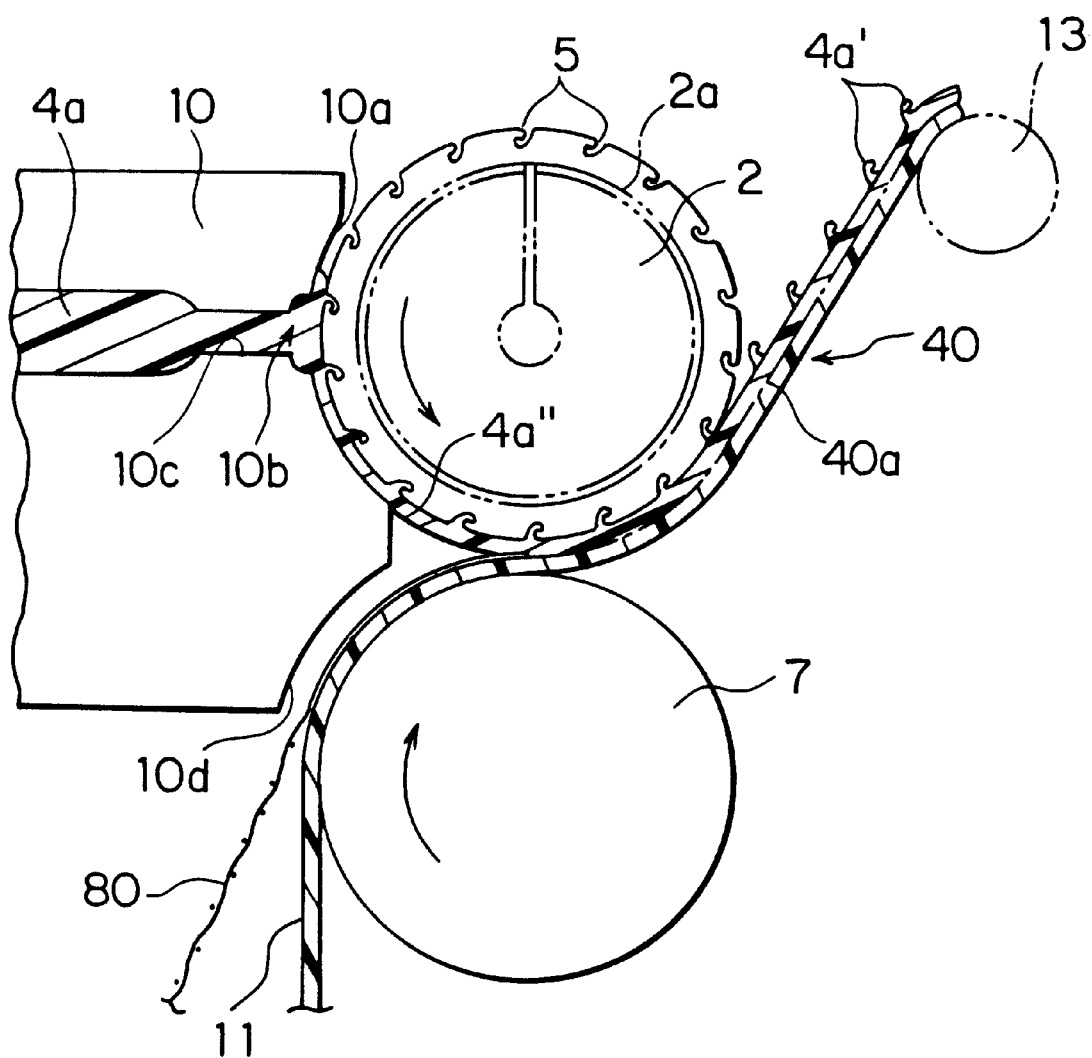
FIG. 2 is a fragmentary longitudinal cross-sectional view of an apparatus for carrying out a molded surface fastener member manufacturing method according to a second embodiment of this invention.

FIG. 2 shows an apparatus for carrying out a method according to a second embodiment of method for manufacturing a molded surface fastener member 40 in which a porous core sheet is embedded. In this embodiment, the second injection nozzle 6 of the first embodiment is omitted, and a resin sheet 11 previously molded in a thickness substantially equal to a half of the thickness of a substrate sheet 40a of the surface fastener member 40 is introduced to the gap between a die wheel 2 and an associated roller 7, and synthetic resin net or a thin woven web 80 having a low weaving density is introduced to a meeting point of the previously molded resin sheet 11 and a semi-molded product, which is composed of a multiplicity of engaging elements 4a' and a substrate sheet part 4a", which are molded on the circumferential surface of the die wheel 2 as molten resin is injected to the die wheel 2 from a single injection nozzle 10.

Specifically, the upper front end portion of the injection nozzle 10 has a first arcuate surface 10a confronting the circumferential surface of the die wheel 2 and spaced from the circumferential surface by a gap corresponding to substantially a half of the thickness of the substrate sheet 40a of the molded surface fastener member 40 to be manufactured, like wise in the previous embodiment. The injection nozzle 10 has in the center of the arcuate surface 10a a resin orifice 10b communicating with a single sprue 1c. The lower front end portion the of the injection nozzle 10 also has a second arcuate surface 10d confronting the circumferential surface of the associated roller 7 with a gap slightly larger than a half of the thickness of the substrate sheet 40a. The resin sheet 11 to be supplied from the lower side passes the gap between the second arcuate surface 10d of the injection nozzle 10 and the associated roller 7 as carried on the circumferential surface of the associated roller 7. In this embodiment, the resin sheet 11 is a film molded of the same kind of synthetic resin as the molten resin to be injected from the injection nozzle 10, and the thickness of the resin sheet 11 may be changed as the demand arises.

The synthetic resin net or the thin woven web 80 is supplied from the lower side of the injection nozzle 10 likewise the film 11 and is superposed over the front surface of the film 11, which is carried on the circumferential surface of the associated roller 7, at the lower end of the gap between the second arcuate surface 10d of the injection nozzle 10 and the associated roller 7 and passes through the gap together with the film 11. During this passing, the film 11 and the woven web 80 are heated by radiant heat from the second arcuate surface 10d of the injection nozzle 10. By heating the film 11 and the woven web 80 before meeting with the substrate sheet part 4a" which is in a semi-molten state and is carried on the circumferential surface of the die wheel 2, welding of these three members into a unitary laminate substrate sheet 40a is facilitated.

Thus the substrate sheet part 4a", the woven web 80 and the film 11 are compressed between the die wheel 2 and the associated roller 7 into a thickness of the substrate sheet 40a of the molded surface fastener member 40 as a final product to form a unitary laminate form in which the woven web 80 is embedded between the substrate sheet part 4a" and the film 11, which have the same thickness. At that time excessive resin materials moves transversely outwardly toward opposite axial ends of the die wheel 2 and the associated roller 7 via the gap between them in the same manner as the previous embodiment. The substrate sheet 40a of the surface fastener member 40, in which the woven web 80 is embedded, revolves along substantially a quarter of the circumferential surface of the die wheel 2 as guided by a guide roller 13, during which the substrate sheet 40a together with the engaging elements 4a' are cooled from inside of the die wheel 2 and are hence successively solidified as the final product, namely, the molded surface fastener member 40. During this solidification, the substrate sheet 40a is drawn in the direction of injection under an appropriate pulling force, the individual engaging elements 4a' in the cavities 5 are smoothly removed off the cavities 5 resiliently deforming in straight posture, and immediately after that, they restore their original shape to become completely solidified.

Figure 4:
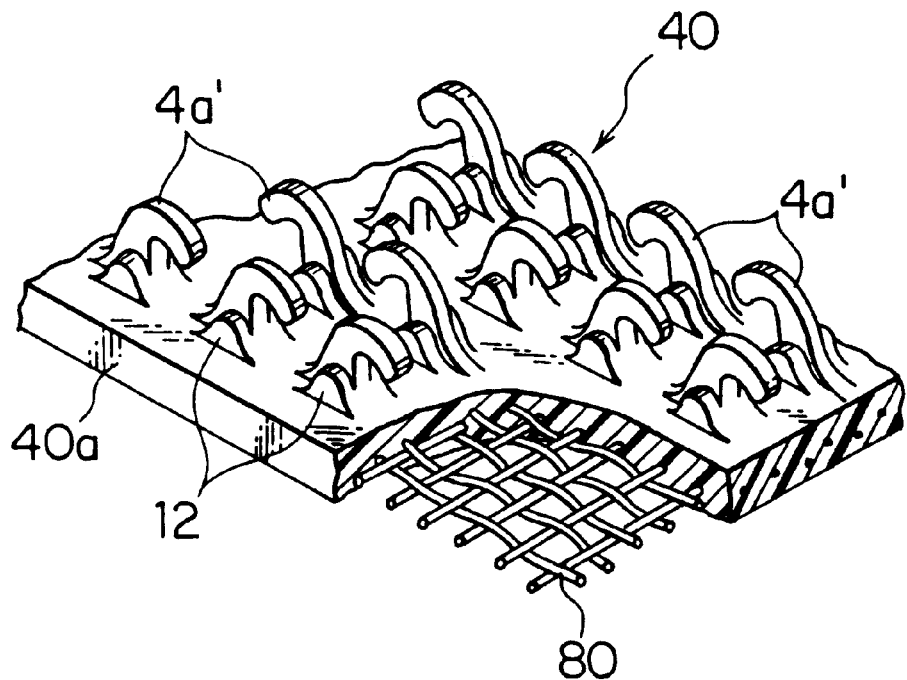
FIG. 4 is a fragmentary perspective view, with parts broken away, of a molded surface fastener member according to a second embodiment of the surface fastener member manufactured by the apparatus of FIG. 2.
Figure 5:
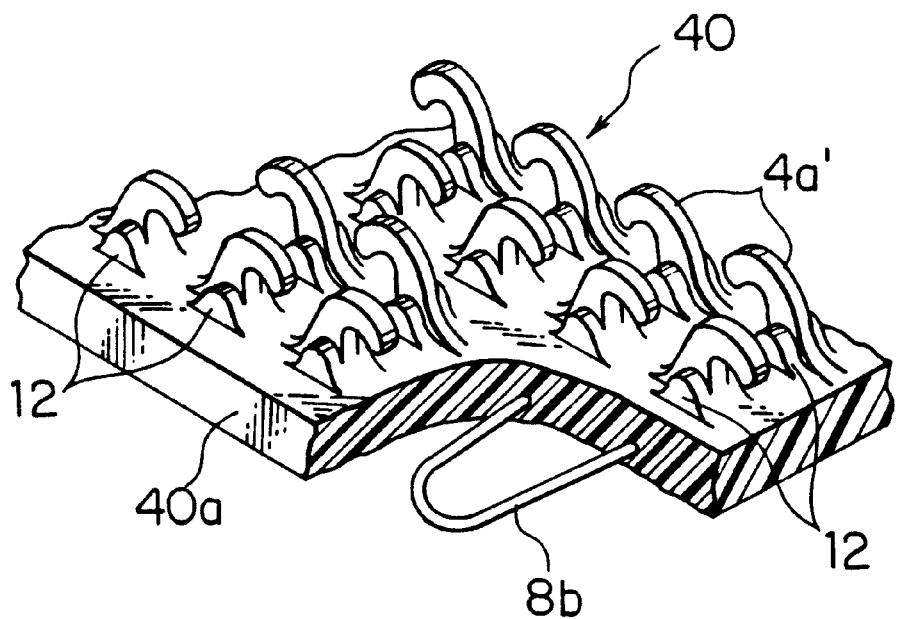
FIG. 5 is a fragmentary perspective view, with parts broken away, of a molded surface fastener member according to a third embodiment of the surface fastener member.
Figure 6:
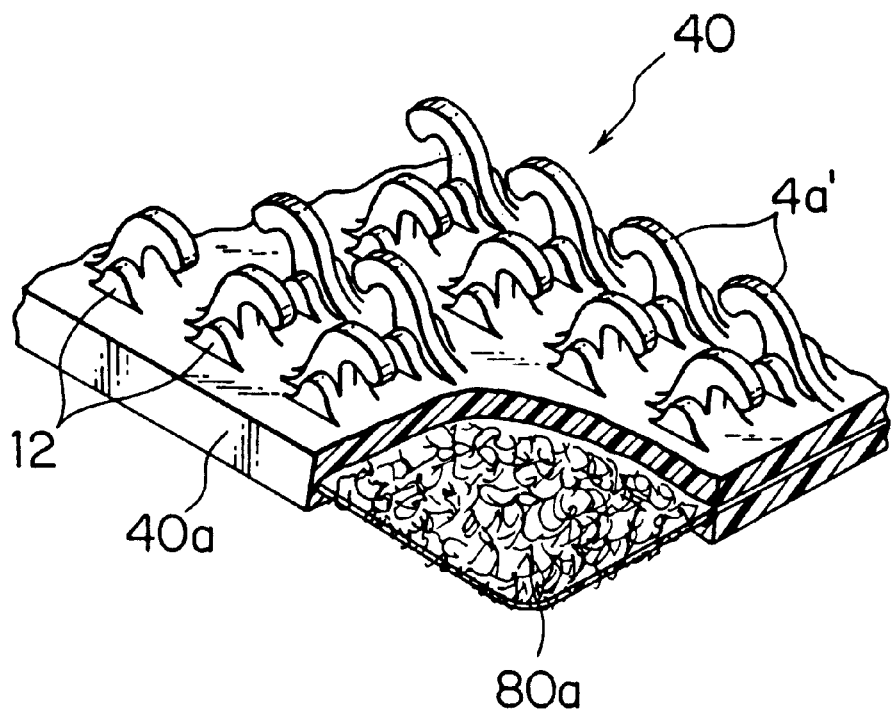
FIG. 6 is a fragmentary perspective view, with parts broken away, of a molded surface fastener member according to a fourth embodiment of the surface fastener member.
Figure 7:
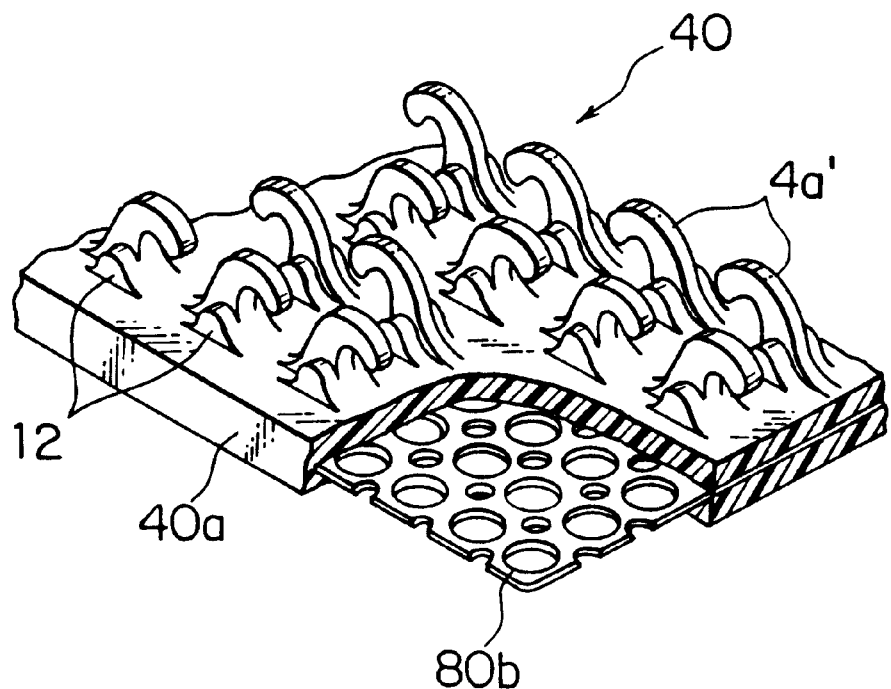
FIG. 7 is a fragmentary perspective view, with parts broken away, of a molded surface fastener member according to a fifth embodiment of the surface fastener member.

In the thus manufactured surface fastener member 40, since the woven web 80 which has a fibrous structure stable in shape is embedded in the substrate sheet 40a centrally of its thickness as shown in FIG. 4, the surface fastener member 40 is stable in shape free from unnecessary expansion even when it is drawn from the die wheel 2 and is prevented from being torn or otherwise damaged due to the sewing needle during sewing thus a reliable sewing is realized.

In the foregoing embodiments, in the illustrated examples, the engaging elements 4a' in adjacent rows are oriented in opposite directions so that the resulting surface fastener member 40 has no directivity in engaging force. Further, in the associated roller 7, there may be provided engaging-element-forming cavities 5 like the die wheel 2 for molding a surface fastener member 40 which has engaging elements 4a' on both sides of the substrate sheet part 4a. This invention should by no means be limited to the foregoing embodiments, and various modifications may be suggested without departing from the gist of this invention.

As is described in detail, according to the molded surface fastener member and its manufacturing method according to this invention, it is possible to continuously manufacture a molded-type surface fastener member in which a porous core sheet 8, such as various patterns of arrangement of fiber threads or a high-porosity woven web is embedded in a substrate sheet 40a substantially centrally of its thickness in a single simple process. Since the porous core sheet 8 is embedded in the substrate sheet 40a substantially centrally of its thickness without deviating to either of the front and rear sides of the substrate sheet 40a, the substrate sheet 40a is prevented from being torn in any local portions. Further, since the substrate sheet 40a is hard to expand when being pulled, it is possible to obtain a high-quality molded surface fastener member which is stable in shape, easy to process and excellent in durability.

Also, in this invention, when the non-porous sheet 80c having the resin-receiving recesses 81c on its front and rear sides is used, a part of the molten resin filled inside of the resin-receiving recesses 81c so that the substrate sheet 40a and the sheet 80c are firmly joined. Particularly, when the metal thin film is used for the non-porous sheet, a shielding effect against the electromagnetic wave can be expected, and the surface fastener member can be attached directly onto things such as a magnet, thus the field of application varies widely.

What is claimed is:

1. A method of continuously manufacturing a molded surface fastener member having a substrate sheet and a multiplicity of engaging elements, said method comprising the steps of:

(a) rotating a die wheel, which has in its circumferential surface a multiplicity of engaging-element-forming cavities, in one direction;

(b) rotating an associated roller, which is disposed in confronting relation to said die wheel with a predetermined gap, in a direction opposite to said one direction;

(c) continuously injecting first molten resin from a first injection nozzle to the circumferential surface of said die wheel in rotation to mold a first part of said substrate sheet and to fill said engaging-element-forming cavities with part of said first molten resin;

(d) continuously injecting second molten resin in a predetermined width from a second injection nozzle to a circumferential surface of said associated roller in rotation to mold a second part of said substrate sheet;

(e) continuously supplying a resin-receiving core sheet toward a meeting point of said first and second parts of said substrate sheet, which revolve as carried on the respective circumferential surfaces of said die wheel and said associated roller, to introduce said resin-receiving core sheet between said first and second substrate sheet parts;

(f) pressing said first and second substrate sheet parts, with said introduced resin-receiving core sheet being centrally disposed, from opposite sides by said die wheel and said associated roller to form a unitary laminate surface fastener member;

(g) cooling said laminate surface fastener member together with said engaging elements; and (h) positively drawing said cooled surface fastener member together with said engaging elements from the circumferential surface of said die wheel.

2. A method according to claim 1, wherein said resin-receiving core sheet is a porous sheet made of fiber, synthetic resin or metal.

3. A method according to claim 1, wherein that said resin-receiving core sheet is a non-porous sheet having resin-receiving recesses on front and rear sides.

4. A method according to claim 3, wherein said resin-receiving recess has such a contour that an amount of received resin increases from an inlet toward a bottom.

5. A method according to claim 3, wherein said resin-receiving core sheet is a synthetic resin sheet.

6. A method according to claim 3, wherein said resin-receiving core sheet is a metal thin film.

7. A method of continuously manufacturing a molded surface fastener member having a substrate sheet and a multiplicity of engaging elements, said method comprising the steps of:
  (a) rotating a die wheel, which has in its circumferential surface a multiplicity of engaging-element-forming cavities, in one direction;
  (b) rotating an associated roller, which is disposed in confronting relation to said die wheel with a predetermined gap, in a direction opposite to said one direction;
  (c) continuously injecting molten resin from an injection nozzle to the circumferential surface of said die wheel in rotation to mold part of said substrate sheet and to fill said engaging-element-forming cavities with part of said molten resin;
  (d) continuously introducing a resin sheet along the circumferential surface of said associated roller in rotation;
  (e) supplying a porous core sheet toward a meeting point of said molten resin and said resin sheet, which revolve as carried on the respective circumferential surfaces of said die wheel and said associated roller, to introduce said porous core sheet between said molten resin and said resin sheet;
  (f) pressing said part of said substrate sheet and said resin sheet consisting the other part of said substrate sheet with said introduced porous core sheet being centrally disposed, from opposite sides by said die wheel and said associated roller to form a unitary laminate surface fastener member;
  (g) cooling said laminate surface fastener member together with said engaging elements; and
  (h) positively drawing said cooled surface fastener member together with said engaging elements from the circumferential surface of said die wheel.

8. A method according to claim 7, wherein said resin sheet is preheated before being introduced to said meeting point.

9. A method according to claim 7 or 8, wherein said porous core sheet is composed of at least a multiplicity of fiber threads spaced transversely of said substrate sheet at predetermined distances.

10. A method according to claim 7, wherein said porous core sheet is composed of at least a multiplicity of fiber threads spaced longitudinally of said substrate sheet at predetermined distances.

11. A method according to claim 7, wherein said porous core sheet is composed of at least a fiber thread extending longitudinally of said substrate sheet in a meandering pattern at predetermined pitches.

12. A method according to claim 7, wherein said porous core sheet is in the form of woven web, knit web, non-woven cloth, mesh of synthetic resin film, each of which is high in porosity.

13. A method according to claim 7, wherein parts of said substrate sheet disposed on front and rear sides of said porous core sheet are made of the same material.

14. A method according to claim 7, wherein parts of said substrate sheet disposed on front and rear sides of said porous core sheet are made of different materials.

15. A molded surface fastener member comprising:
  a synthetic resin substrate sheet having a first layer formed from resin and having a first predetermined thickness, and a second layer formed from resin separate from the first layer and having a second predetermined thickness, the first layer connected to the second layer and having a multiplicity of engaging elements on one side; and
  a core sheet between the first and second layers of the substrate sheet;
  wherein the core sheet is embedded substantially centrally in width direction of the substrate sheet, by introducing said core sheet between the first and second layers of said synthetic resin substrate sheet, said first and second layers being circumferentially moved on respective surfaces of a die wheel having a multiplicity of engaging-element forming cavities in its circumferential surface and rotating in one direction and of an associated roller disposed in confronting relation to said die wheel and rotating in a direction opposite to said one direction, and by pressing said first and second layers of said synthetic resin substrate sheet by said die wheel and said associated roller so as to press said core sheet.

16. A molded surface fastener member according to claim 15, wherein said core sheet is a non-porous sheet having resin-receiving recesses on its front and rear sides.

17. A molded surface fastener member according to claim 16, wherein said resin-receiving recess has such a contour that an amount of received resin increases from an inlet toward a bottom.

18. A molded surface fastener member according to claim 16, wherein said resin-receiving core sheet is made of synthetic resin.

19. A molded surface fastener member according to claim 16, wherein said resin-receiving core sheet is a metal thin film.

20. A molded surface fastener member according to claim 16, wherein parts of said substrate sheet disposed on front and rear sides of said core sheet are made of different materials.

21. A molded surface fastener member according to claim 15, wherein said core sheet is composed at least a multiplicity of fiber threads spaced transversely of said substrate sheet at predetermined distances.

22. A molded surface fastener member according to claim 15, wherein said core sheet is composed of at least a multiplicity of fiber threads spaced longitudinally of said substrate sheet at predetermined distances.

23. A molded surface fastener member according to claim 15, wherein said core sheet is composed of at least a fiber thread extending longitudinally of said substrate sheet in a meandering pattern at predetermined pitches.

24. A molded surface fastener member according to claim 15, wherein said core sheet is in the form of woven web, knit web, non-woven cloth, or mesh, each of which is high in porosity.

25. A molded surface fastener member according to claim 15, wherein said core sheet is a synthetic resin film having a multiplicity of pores through said core sheet from a front side to a rear side thereof.

26. A molded surface fastener member according to claim 15, wherein parts of said substrate sheet disposed on front and rear sides of said core sheet are made of the same material.

27. A molded surface fastener member according to claim 15, wherein parts of said substrate sheet disposed on front and rear sides of said core sheet are made of different materials.

28. A molded surface fastener according to claim 15, wherein the core sheet connects the first and second layers together.

* * * * *